(12) United States Patent
Bellas et al.

(10) Patent No.: US 7,441,224 B2
(45) Date of Patent: Oct. 21, 2008

(54) STREAMING KERNEL SELECTION FOR RECONFIGURABLE PROCESSOR

(75) Inventors: Nikos Bellas, Chicago, IL (US); Sek Chai, Streamwood, IL (US); Daniel Linzmeier, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 394 days.

(21) Appl. No.: 11/276,657

(22) Filed: Mar. 9, 2006

(65) Prior Publication Data

US 2007/0213851 A1  Sep. 13, 2007

(51) Int. Cl.
*G06F 17/50* (2006.01)
(52) U.S. Cl. .......................................... 716/16; 716/17
(58) Field of Classification Search ................. 716/1, 716/16, 17
See application file for complete search history.

(56) References Cited

U.S. PATENT DOCUMENTS 6,622,287 B1   9/2003   Henkel
6,941,548 B2 * 9/2005 Goodwin et al. ............ 717/151
7,234,126 B2 * 6/2007 Catthoor et al. ............. 716/18
7,305,649 B2 * 12/2007 Bellas et al. ................. 716/17

FOREIGN PATENT DOCUMENTS

WO   03/034216 A2   4/2003

OTHER PUBLICATIONS

Clark, Nathan et al.: "Processor Acceleration Through Automated Instruction Set Customization", Appears in proceedings of the 36th International Symposium on Microarchitecture, Dec. 3-5, 2003, pp. 1-12.

* cited by examiner

*Primary Examiner*—Stacy A Whitmore
*Assistant Examiner*—Binh C Tat

(57) ABSTRACT

In one embodiment, a subset of a set of streaming kernels of an application is selected for implementation on a reconfigurable processor. The streaming kernels are selected by first forming a stream flow graph of the application by parsing a program of instructions of the application, the stream flow graph having kernel nodes and edges, and determining benefit and cost values for each kernel node in the stream flow graph. Next, a subset of the kernel nodes that maximizes a weighted sum of the benefits values is selected, subject to a constraint that the sum of cost values is not greater than a prescribed value for the reconfigurable processor.

23 Claims, 4 Drawing Sheets

STREAMING KERNEL SELECTION FOR RECONFIGURABLE PROCESSOR

BACKGROUND

Hardware accelerators are increasingly used to extend the computational capabilities of baseline scalar processors to meet the growing performance and power requirements of embedded applications. The challenge to the designer is the extensive human effort required to identify the appropriate kernels to be mapped to gates, and to implement a network of accelerators to execute the kernels.

The levels of integration of modern field programmable gate arrays (FPGA's) have advanced to the point where complex Systems on a Chip (SoC's) with processors, accelerator IP, peripherals, and system software can be built and deployed very rapidly. Prior software tools have offered a plethora of predefined IP cores for frequently used kernels in multimedia, communications, networking, etc. However, existing software tools do not allow an application developer to extract computationally complex kernels from an application and map them to gates in an automated way.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
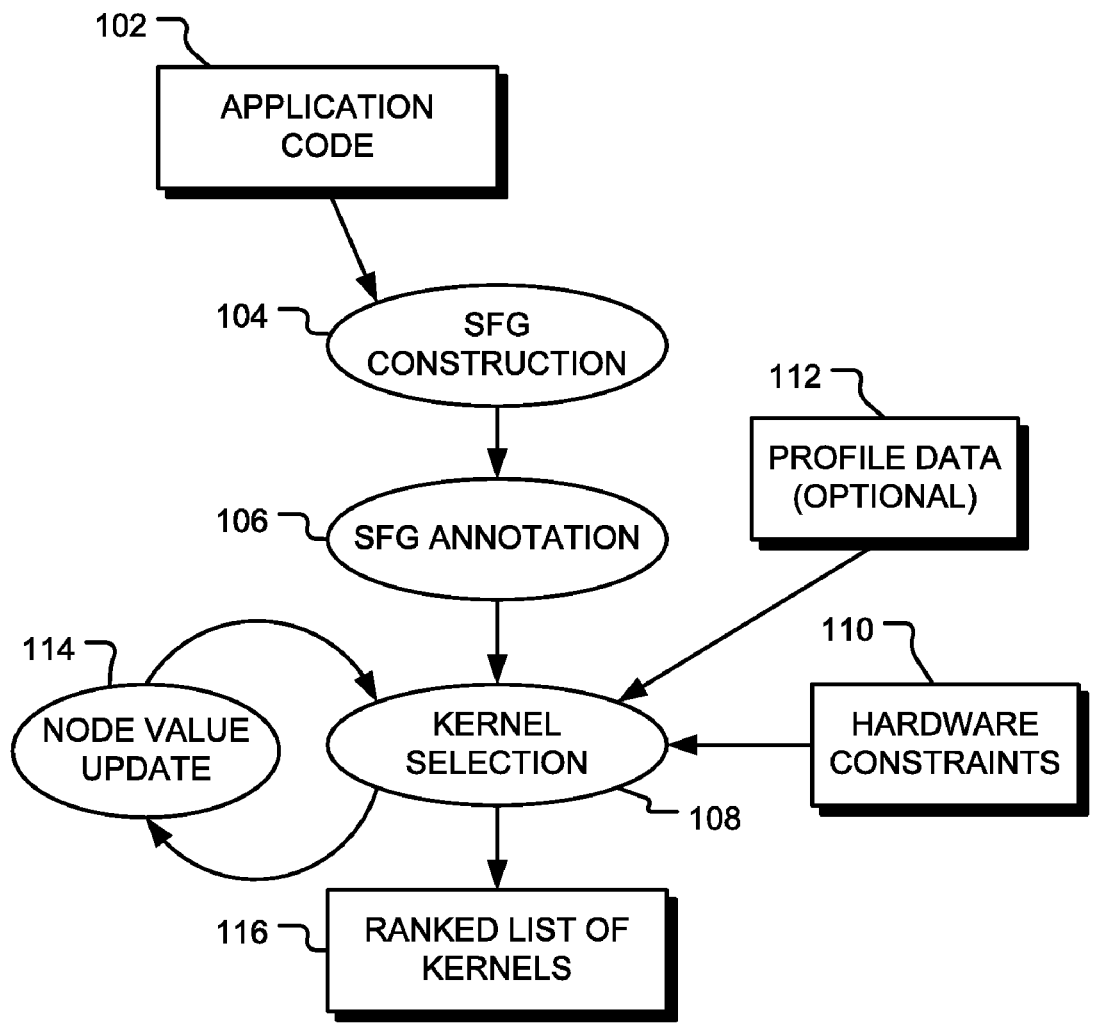
FIG. 1 is a diagram of a method for kernel selection consistent with certain embodiments.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a methodology to automate the selection of streaming kernels in a reconfigurable platform based on the characteristics of the application to be implemented. The methodology is based on a stream flow graph that describes the streaming computations and communications. The stream flow graph is used to identify the most profitable subset of streaming kernels that optimizes performance without exceeding the available area of the reconfigurable fabric.

A software tool based upon the methodology allows an application developer to extract computationally complex kernels from an application and map them to gates in an automated way. The availability of a tool flow that abstracts out the hardware details of a module or a set of modules and presents a familiar software-only programming model is beneficial for the acceptance of field-programmable gate arrays (FPGA's) and other reconfigurable logic by a large pool of software engineers and algorithm developers.

Central to the design of such a tool is the automated selection of an optimal subset of kernels under hardware area constraints. Reconfigurable logic is customized post-fabrication, and has only a finite number of logic cells to implement an application. It is often the case that the hardware designers have to iterate multiple times and perform manual software hardware partition of an application before a successful generation of the FPGA bit stream.

Kernels are selected to be mapped into gates based not only on their execution time, but also on their data communication profile, and their inherent parallelism and speed-up potential. An important aspect of the selection process is the efficient representation of the streaming domain and the exploration of the design space without artificially limiting the potential solutions.

The approach described below considers the performance of the whole streaming application and may be implemented, for example, on a platform comprising a scalar processor connected to the network of streaming accelerators using the system bus and, optionally, high speed, point-to-point interconnections between streaming accelerators.

Streaming programs consist of a number of interconnected filters that communicate using data streams. The streaming programming model separates communication from computation, and favors data intensive applications with a regular memory access patterns. Computation kernels are independent and self-contained and are localized such that there are no data dependencies between other kernels. In addition, computation groups are relatively static. The processing performed in each computation group is regular or repetitive, and is often in the form of a loop structure.

Computation kernels produce an output stream from one or more input streams. The stream and other scalar values which hold persistent application state are identified explicitly as variables in a communication stream or signal between kernels.

Overview. FIG. 1 is a diagram of a method for kernel selection consistent with certain embodiments of the present invention. Referring to FIG. 1, the application code 102 may be expressed in a high level language, such as the C language, and may use explicit streaming constructs that identify the computational kernels and the streaming channels used to transfer data. In another embodiment, other high level programming languages may be used to express the computation kernels and streaming channels used to transfer data.

As a precursor to the kernel selection, a stream flow graph (SFG) data structure is constructed at block 104, based on the streaming data flow of the application and the available hardware resources that participate in the application. Then, at block 106, the nodes and edges of the SFG are annotated (associated) with metrics that summarize the execution profile of the application and form the basis for the solution space exploration that occurs next.

The kernel selection at block 108 uses system level constraints 110 such as maximum available area in number of configurable logic blocks (CLB's) or equivalent logic gates, available memory and available bus bandwidth. Optionally, profiling data 112 of the execution time of each kernel, and its bandwidth can be used if available.

Two exemplary strategies for selecting kernels will now be described. The first strategy is to iteratively select streaming kernels based simply on their annotation in the SFG. The second strategy adapts to the current selections that have already been made and continuously changes the annotation of the unselected kernels to capture the dynamic nature of the selection process better. For example, the second strategy favors neighboring nodes of already selected nodes in order to improve the data locality of the communication and avoid costly transfer to the main memory. This may be achieved by updating the weights applied to the metrics for neighboring nodes at block 114.

The process results in a list of kernels 116 sorted with respect to their selection order. One of the strengths of the method is that no assumption is made on the number and type of accelerators used for the low level implementation. For instance, all the selected kernels of the application can be mapped into a single accelerator, or each kernel to a dedicated accelerator, or any hybrid implementation between these two extremes. The method is largely orthogonal to the final hardware binding details, which makes the selection process easier to converge to a near-optimal solution.

Figure 2:
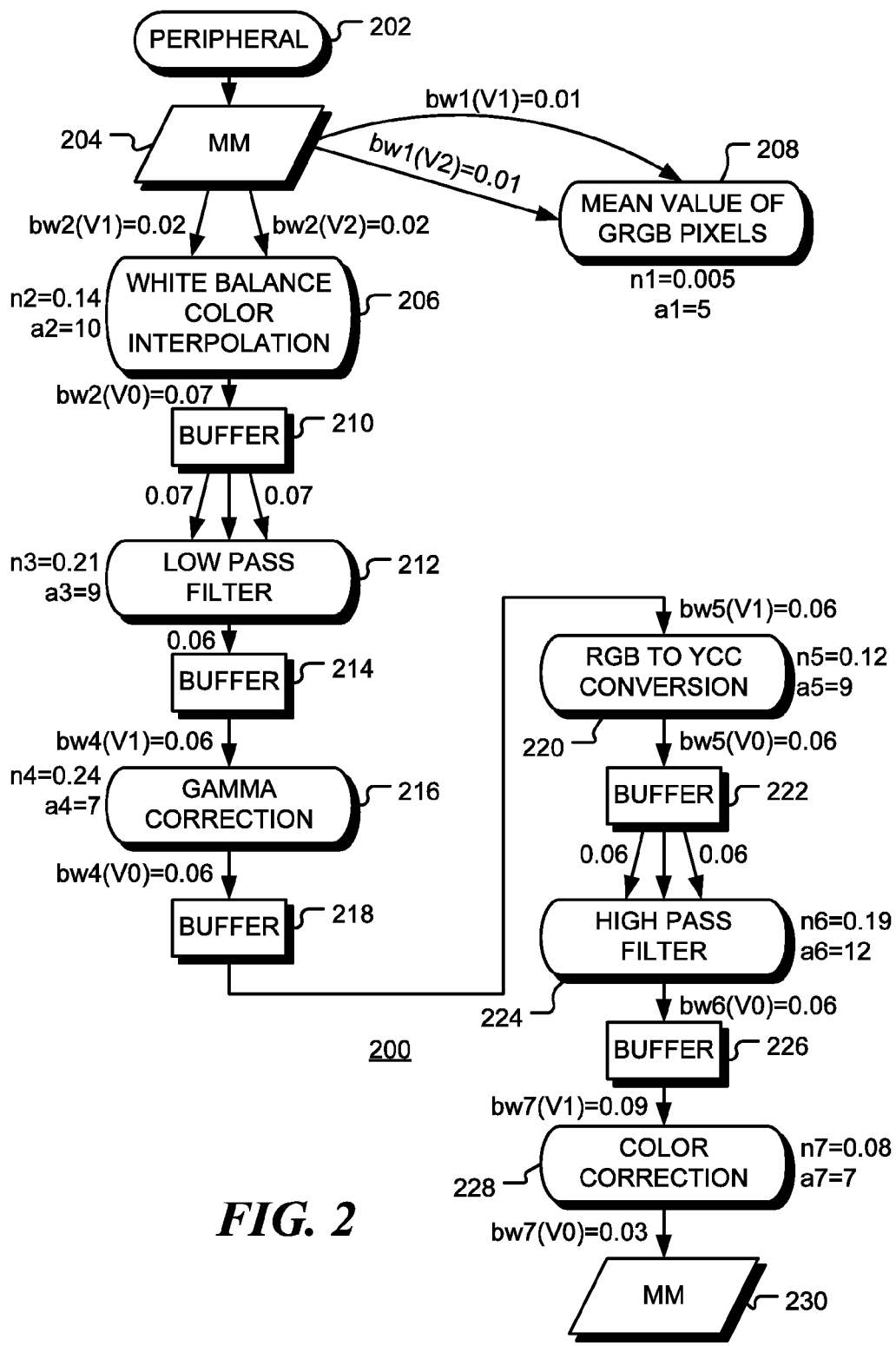
FIG. 2 is an exemplary stream flow graph consistent with certain embodiments.

Annotated stream flow graph. FIG. 2 is an exemplary stream flow graph (SFG) consistent with certain embodiments of the present invention. A stream flow graph of an application A in a system S is a directed graph G(A,S)=(V,E) having a set of vertices V (202, 204, 206, 212, 216 for example) and set of edges E that connect vertices. A vertex or node u∈V can be one of the following types: kernel nodes that express streaming computation (e.g. 206, 208, 212), buffer nodes that express temporary buffers (e.g. 210, 214), main memory nodes that express main memory (e.g. 204, 230), and peripheral nodes (e.g. 202) that express peripherals that source or sink streams (e.g. image sensors or LCD displays). An edge e=(u, v)∈E connects two nodes if there is a stream produced by u and consumed by v in the application.

The SFG depends on the application as well as the architecture of the system. The application determines the structure of the SFG, while the system determines the type of nodes that are available and how they can be used.

The SFG expresses static, as opposed to dynamic, stream flow. There is an edge between two nodes u and v if there is a stream flow between them, and also a thread of control in the code in which first u and then v is executed (or accessed), even if that thread is not executed in the dynamic program. For instance, in case of a conditional if-then-else or case statement, there will be edges between all potential paths between kernels.

The SFG is built as a preprocessing step during compilation time. If the programmer or an optimizing compiler uses loop tiling to partition the kernel execution across data tiles and to place the communicating streams in tile buffers, the SFG preprocessor instantiates buffer nodes. Otherwise, it instantiates main memory nodes. The tool may be used after a source-level optimizing compiler that performs tiling but it does not perform any source code optimizations by itself.

FIG. 2 shows an exemplary SFG for a tiled implementation of an image processing chain used for processing color data from an image sensor. Tiled frame data are processed by computation kernels one tile at a time. If the programmer did not use tiling, the SFG would contain main memory nodes in between the kernels.

The annotation of SFG nodes is used to capture dynamic execution activity, when the application is driven by a set of input data. Each kernel node u∈V is assigned both a value using the benefit function $f(u)$, and a cost $c(u)$. The purpose of the SFG annotation is to rank the kernel nodes so that the best candidates are used for hardware implementation. In one embodiment, the benefit function is a weighted sum of three metrics that are used to grade the computational complexity, the bandwidth, and the potential for parallelism of the kernel:

$$f(u)=w_1*n(u)+w_2*(bw_{in}(u)+bw_{out}(u))+w_3*p(u),$$

where $w_1$, $w_2$ and $w_3$ are weight values. The weights sum to unity, that is, $w_1+w_2+w_3=1$. The metrics on the right hand side of this expression are discussed below, and may be determined by profiling data or, in some cases, by static analysis of the application code. Different weights $w_i$ will affect the types of candidates selected.

The computational metric n(u) is the execution time of kernel u as a percentage of the sum of execution times of all kernels in V in the accelerated version of the code. The metric assumes a perfect memory system, and it represents only the percentage of computation time, and not of memory accesses overhead. For instance, the Low Pass Filter kernel 212 accounts for 21% of the execution time of all streaming kernels, in FIG. 2.

The bandwidth metric b(e) of edge e equals the number of bytes that were transferred via edge e as a percentage of all bytes transferred between all edges in the SFG. For a node u, $bw_{in}(u)=\Sigma_{inedges}b(e)$, and $bw_{out}(u)=\Sigma_{outedges}b(e)$. For the Low Pass Filter kernel, 212, $b_{win}(u)=0.7*3=0.21$ and $b_{wout}(u)=0.06$. The purpose of this metric is to include kernels that process large amount of streaming data. By selecting such kernels, the algorithm can form clusters of high bandwidth kernels so that the data are not transferred back and forth between the accelerators and the memory. This will be discussed again below.

The metric p(u) considers the complexity of the memory access pattern of node u to evaluate the potential for speed up when u is mapped to gates. The largest performance gains are possible when the streams in and out of the kernel have regular access patterns similar in shape to the order with which data are stored in the main memory (e.g. row-wise). Memory-bound kernels are restricted by the memory access inefficiencies even if a large number of functional units are used to implement the computations. In one embodiment, $$p(u) = \frac{\sum_{\forall s \in S} SAE(s)}{|S| + 1},$$

in which S is the set of all the streams consumed and produced by u, and SAE(s), the stream access efficiency function of stream s, is the number of stream elements of stream s fetched in every bus cycle, on average. Kernels with a large number of I/O streams, and low stream access efficiency, are less likely to be selected. In another embodiment, when a kernel is invoked in multiple locations in the application (potentially with different stream descriptors), the algorithm may use a weighted average value of the SAE value.

Figure 3:
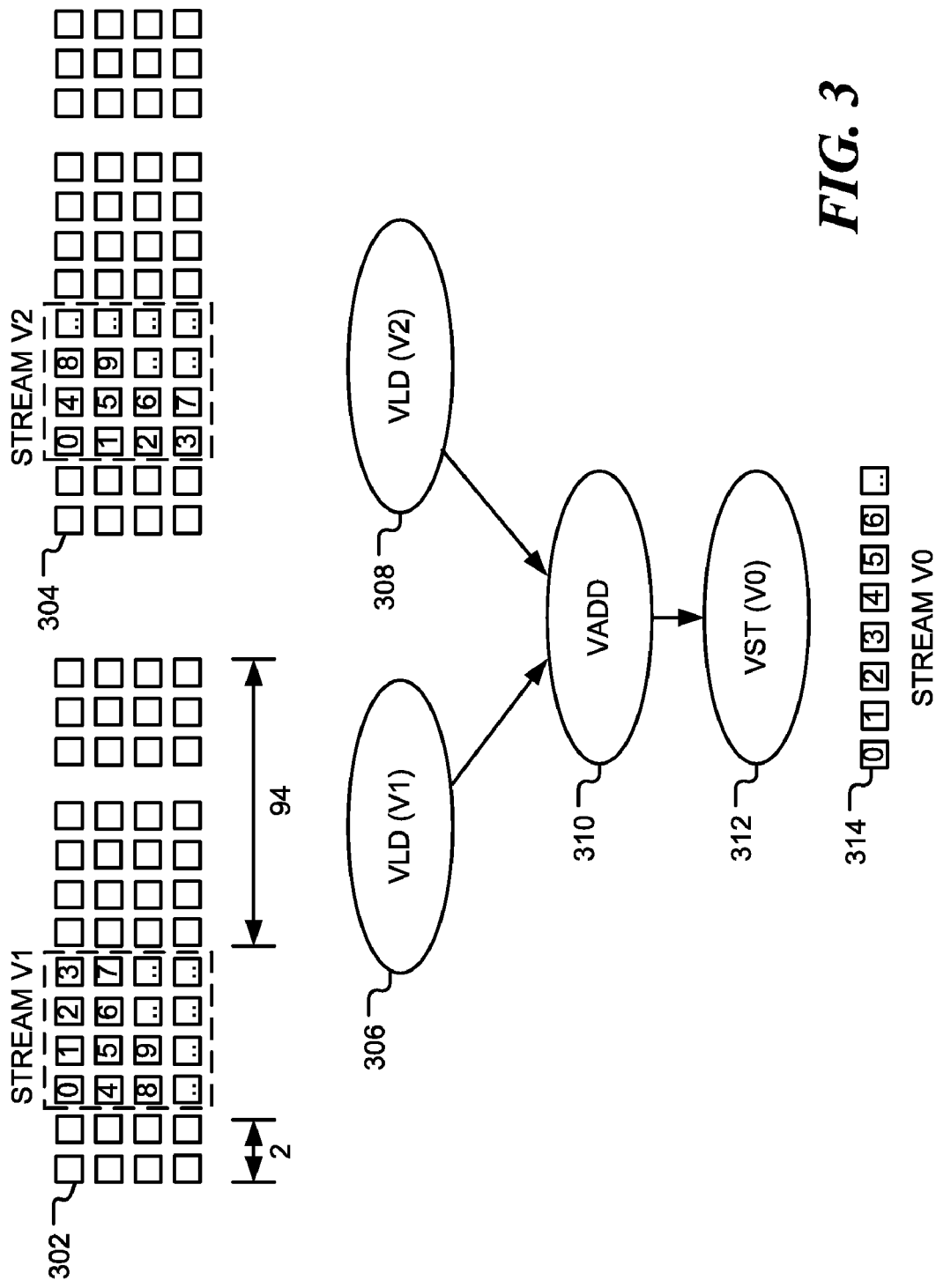
FIG. 3 is an exemplary data flow graph of a vector-add operation.

An exemplary data flow graph (DFG) kernel of a simple vector-add operation is shown in FIG. 3. In FIG. 3, stream V1 is stored as a rectangular array in memory 302 and stream V2 is stored as a rectangular array in memory 304. The location and shape of streams in the memory may defined using stream descriptors such as Type, Start_Address, Stride, Span, Skip, Size etc., where, for example, Type is the size of each data element, Stride is the spacing, in number of elements, between two consecutive stream elements, Span is the number of elements that are gathered before applying the skip offset and Skip is the offset is applied between groups of span elements, after the stride has been applied. Size is the number of elements in the stream. In this example, Type=0, Start_Address=2, Stride=1, Span=4, Skip=94, and Size=16. In the DFG, the vector load units 306 and 308 load the streams V1 and V2 respectively. The add unit 310 adds corresponding elements from the two streams and the vector store unit 312 stores the resulting stream V0 in contiguous memory 314.

The stream descriptor notation can be extended to include multiple dimensions, by including multiple span(i), skip(i) (i=0, . . . , N) components. An extra skip, span component add up another dimension in the stream description. The stream descriptor notation can also be extended to non-rectangular shapes (e.g. triangular) or any pattern that can be described by in a static form (for example by an algebraic expression or a lookup table).

Assuming, for example, that the system bus can fetch 8 bytes per cycle, the stream access efficiency values are: SAE (V1)=4/8=0.5, SAE(V2)=1/8=0.125, SAE(V0)=8/8=1. This results in p(u)=(0.5+0.125+1)/4=0.28.

The cost of selecting a node u is equal to the area complexity of the node a(u). When the area of the accelerator implementation is unknown, the algorithm may use an area estimation metric that is proportional to the number, type and bit-width of the nodes of the DFG of node u. To that effect, a predefined hardware table can be used that stores the area cost of each node type of the DFG. This cost is scaled to match the bit-width of the specific node. The hardware table considers the area complexity of computational nodes and of stream push (or store) and pop (or load) nodes. These nodes create streaming units that are separate from the data path but contribute substantially to the final area.

Although the area of the accelerator that will finally implement the node u may be different than that computed by this method, what is important is the consistency of the area estimation. In other words, a more complex kernel with a higher cost a(u) should also be implemented in a larger accelerator.

In a further embodiment, the cost of selecting a node u is related to the power dissipation of node when implemented. In this case the constraint is the maximum power. Power dissipation and area constraints may be considered in combination.

The weights $w_i$ are user defined and depend on the application. The weight $w_2$ may be set to zero for SFG edges that correspond to a transfer of streaming data between a kernel and the main memory. In that case, selecting neighboring kernels does not offer any advantages because the streams will be stored to main memory, and using temporary on-chip storage is not possible.

Referring again to FIG. 2, a data stream originates at peripheral 202 and is stored in main memory 204. Node 208 is a computational kernel that, in this example, computes the mean value of GRBG (Green, Red, Blue, Green) pixels in an image. The execution time n1=0.005 of this computation is 0.5% of the total. The area estimation metric is a1=5. The node receives two data streams, V1 and V2. The bandwidth metrics of these streams are both 0.01 indicating that each represents 1% of all bytes transferred between all edges in the SFG. Similarly, computational node 206 has execution metric n2=0.14 and area metric a2=10. The kernel receives two data streams having bandwidth metrics bw2(V1)=0.02 and bw2 (V2)=0.02. Since this is a tiled implementation, the output stream V0 is stored in buffer node 210. Nodes 212, 216, 220, 224 and 228 correspond to further computational kernels, interconnected via buffers 214, 218, 222 and 226. An execution time and area metric are associated with each node in the stream flow graph 200, and bandwidth metrics are associated with each edge in the stream flow graph. The output stream is stored in main memory 230.

The stream flow graph, together with the associated annotations may be represented as a data structure. Construction of the SFG may be performed in a compiler pre-processing step.

SFG space exploration and kernel selection. Based on the SFG formulation, the next step is the selection of an optimal set of kernels that maximizes the benefit subject to a cost constraint. The selection process is similar to the 0/1 knapsack problem, which is NP-complete. Given a set of resources (the kernel nodes), with each resource having a benefit value f(u) and cost value a(u), the objective is to maximize the benefit of selected resources for given maximum cost. The cost may be the area A, for example. The problem can be solved optimally in pseudo-polynomial time using dynamic algorithms. However, experiments indicate that a simple greedy algorithm often works almost as well as a dynamic algorithm. In the greedy algorithm, the next kernel u with the highest value of the benefit/cost ratio $$\frac{f(u)}{a(u)}$$

is selected. In the dynamic algorithm of the pseudo-code listing below, the DYN_COST_1 procedure is called first to compute the value array, in which the entry C[i] [a] contains the maximum value when only i kernels are present, and the maximum area is a. Then, the DYN_SEL_1 procedure traverses the array C to select the set of kernels.

In one embodiment, the dynamic algorithm is extended to adapt to the dynamic flow by favoring kernel nodes that are adjacent to already selected nodes. Once a kernel node u is selected, the value f(v) of all nodes v that are connected with u via a buffer node is scaled up by a user defined factor $w_{rel}$. This dynamic update facilitates the clustering of nodes so that streaming data do not need to be accessed from memory unnecessarily. A greedy algorithm can be used in this case as well.

Pseudo-Code Listing

```
DYN_COST_1
Input: f[0..N-1], a[0..A-1], N, A;
Output: C[0..N-1];
{
    C[0, 0..A] = 0;
    C[0..N, 0] = 0;
    for (i = 0; i ≦ N; i++) {
        for (a = 1; a ≦ A; a++) {
            if (a_i > a)
                C[i, a] = C[i-1, a]
            else
                C[i, a] = max{C[i-1, a], f(u_i) + C[i-1, a- a_i]}
        }
    }
    return C;
}
DYN_SEL_1
Input: C[0..N][0..A], a[0..A-1], v[0..N-1], N, A
Output: ranked nodes R
{
    i = N; j = A;
    R={ };
    while (i > 0 && j > 0) {
        tmp = a[i-1];
        if (C[i-1][j] ≧ f[i-1] + C[i-1][j-tmp]
            i = i-1
```

-continued

```
        else {
            if (i > 0 && j > tmp) {
                R = R ∪ u_i
                j = j – tmp;
            }
            i = i–1;
        }
    }
    return R;
}
```

Figure 4:
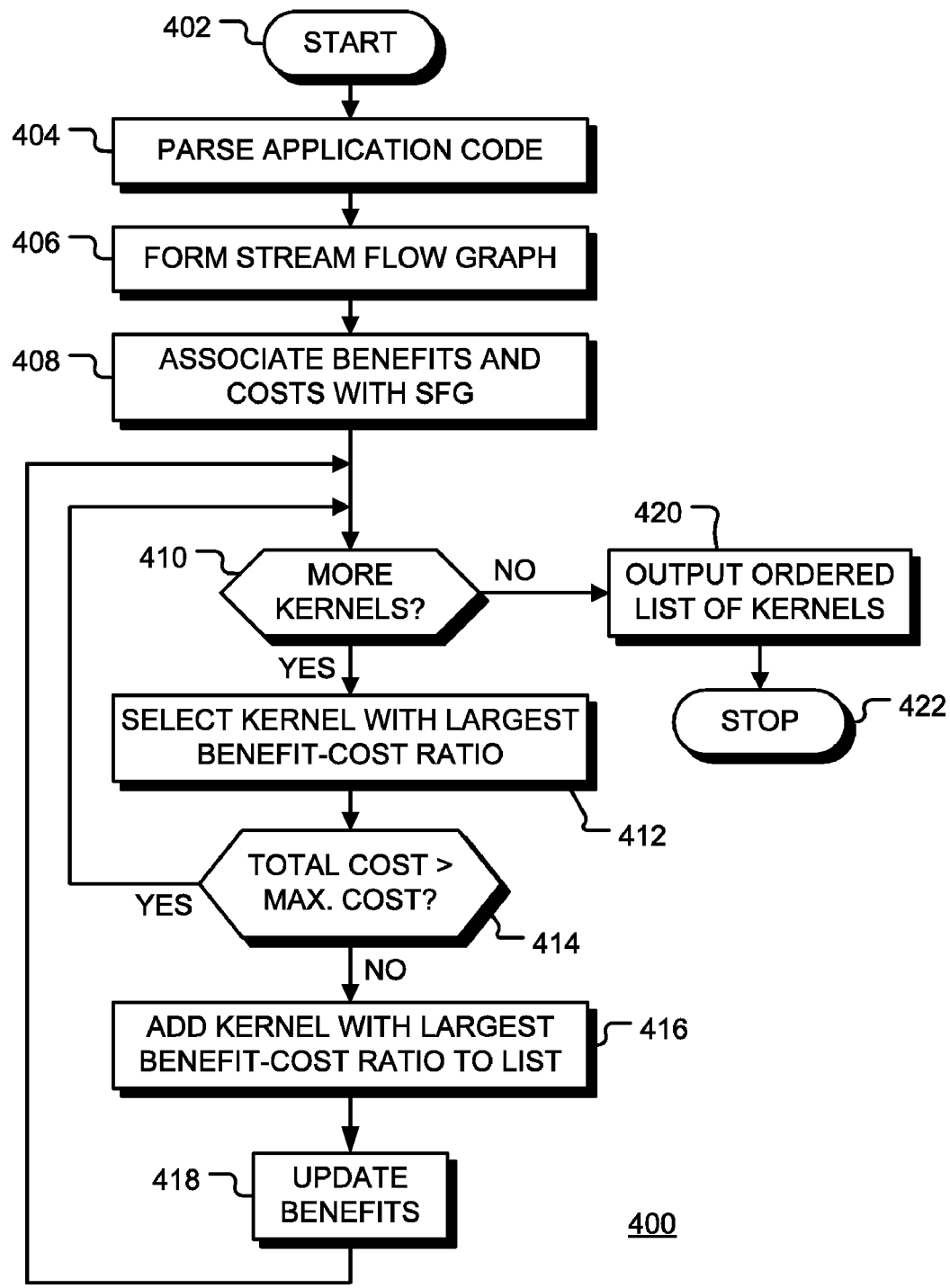
FIG. 4 is a flow chart of a method for kernel selection consistent with certain embodiments.

FIG. 4 is a flow chart of a method 400 for kernel selection consistent with certain embodiments of the present invention. The method is automatic and performed by a computer. Referring to FIG. 4, following start block 402, the application code of a streaming application is parsed at block 404 to identify computational kernels in the code. At block 406 a stream flow graph of the application is formed with computation kernels, buffers, main memory, peripherals, etc forming nodes of the graph and edges of the graph representing stream connections between nodes. At block 408, benefit and cost values are associated with each node and edge of the graph. The benefits may relate to execution cycles, stream traffic, memory access complexity, etc. The costs may relate to the area of logic gates associated with a computational kernel. At decision block 410, a check is made to determine if there are any more kernels to be selected. If there are, as depicted by the positive branch from decision block 410, flow continues to block 412. The flow chart in FIG. 4 depicts uses of a 'greedy' algorithm for kernel selection, but it will be apparent to those of ordinary skill in the art that other selection algorithms may be used. In accordance with the 'greedy' algorithm, the kernel with the highest benefit-to-cost ratio is selected at block 412. At decision block 414, a check is made to determine if the total cost of the selected kernel together with the costs of any previously selected kernels is greater than a prescribed maximum cost value. If not, as depicted by the negative branch from decision block 414, the kernel with the highest benefit-to-cost ratio is added to the list of selected kernels at block 416. If the total cost is greater than the prescribed maximum cost, as depicted by the positive branch from decision 414, flow returns to block 410 to determine if there are more kernels to be selected. Optionally, at block 418, the benefit values associated with the stream flow graph are updated to reflect the additional benefit of selecting kernels that are neighbors of the selected kernel. Another additional criterion is to select kernels that are subsumed by already selected kernels. For example, a kernel that implements a vector addition (V0=V1+V2) can be favored for selection if a kernel that implements a MAC operation (V0=a*V1+V2) has already been selected.

Flow then returns to decision block 410 to determine if there are more kernels to be selected. If there are no more kernels to be selected, as depicted by the negative branch from decision block 410, the ordered list of selected kernels is output at block 420 and the process terminates at block 422.

The present invention, as described in embodiments herein, is implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for automatic selection of a subset of streaming kernels, from a set of streaming kernels of an application, the method comprising:
    forming a stream flow graph of the application from a program of instructions of the application, the stream flow graph comprising a plurality of kernel nodes, corresponding to streaming kernels of the application, and a plurality of edges;
    determining a benefit value and a cost value for each kernel node of the plurality of kernel nodes in the stream flow graph;
    selecting a subset of kernel nodes of the plurality of kernel nodes to maximize a weighted sum of the benefit values of the subset of kernel nodes; and
    storing the subset of kernel nodes,
    wherein the benefit value of a kernel node is dependent upon the computational complexity of a corresponding streaming kernel, the input bandwidth of the corresponding streaming kernel and the output bandwidth of the corresponding streaming kernel.

2. A method in accordance with claim 1, wherein the benefit value of a kernel node is further dependent upon the complexity of a memory access pattern of the corresponding streaming kernel.

3. A method in accordance with claim 1, wherein the cost value of a kernel node is dependent upon the resources required to implement a corresponding streaming kernel.

4. A method in accordance with claim 1, wherein the streaming kernels are to be implemented on a reconfigurable processor, and wherein the cost value of a kernel node is related to the area of the reconfigurable processor required to implement a corresponding streaming kernel.

5. A method in accordance with claim 1, wherein the cost value of a kernel node is related to the power dissipated by a corresponding streaming kernel when implemented on a processor.

6. A method in accordance with claim 1, wherein the stream flow graph further comprises a node corresponding to an element selected from the group consisting of a main memory, a local buffer, a stream source peripheral and a stream sink peripheral.

7. A method in accordance with claim 1, wherein an edge of the stream flow graph connects two nodes of stream flow graph if and only if there exists a static stream flow between the corresponding elements in the application.

8. A method in accordance with claim 1, wherein selecting a subset of kernel nodes comprises:
    initializing the subset of kernels to be an empty set;
    initializing a sum of cost values to zero;
    including a first kernel node having the highest weighted benefit value in the subset of kernel nodes if its cost value is not greater than a prescribed value;

adding the cost value of the first kernel node to the sum of cost values if the cost value is not greater than the prescribed value; and repeating the elements of:
  determining a non-selected set of kernel nodes as those kernel nodes of the plurality of kernel nodes that have not been selected for the subset of kernel nodes;
  selecting, from the non-selected set of kernel nodes, a kernel node having the highest weighted benefit value as a next best kernel node;
  adding the cost value of the next best kernel node to the sum of cost values; and
  including the next best kernel node in the subset of nodes if the sum of cost values is not greater than a prescribed value.

9. A method in accordance with claim 8, wherein selecting a subset of kernel nodes further comprises increasing the weighted benefit value of a kernel node in the non-selected set of kernel nodes if the kernel node is connected in the stream flow graph to the next best kernel node.

10. A method in accordance with claim 8, wherein selecting a subset of kernel nodes further comprises increasing the weighted benefit value of a kernel node in the non-selected set of kernel nodes if the kernel node is subsumed by an already selected kernel.

11. A method in accordance with claim 1, wherein the benefit value of kernel node u is calculated as a function of $n(u)$, $bw_{in}(u)$, $bw_{out}(u)$, $p(u)$ and $a(u)$, where $n(u)$ is node weight of a corresponding streaming kernel, $bw_{in}(u)$ is measure of the input stream traffic to the node, $bw_{out}(u)$ is measure of the output stream traffic from the node, $p(u)$ is a measure of the complexity of the memory access pattern for stream traffic, and $a(u)$ is a corresponding cost value.

12. A method in accordance with claim 11, wherein the weighted benefit value of kernel node u is calculated as $[w_1*n(u)+w_2*bw_{in}(u)+w_3*bw_{out}(u)]/[w_4*a(u)]$, where $w_1$, $w_2$, $w_3$ and $w_4$ are weight values.

13. A method in accordance with claim 1, wherein the weighted benefit value of kernel node u is calculated as a weighted sum of a node weight $n(u)$ of a corresponding streaming kernel, a measure $bw_{in}(u)$ of the input stream traffic to the node, a measure $bw_{out}(u)$ of the output stream traffic from the node and a measure $p(u)$ of the complexity of the memory access pattern for stream traffic, divided by a weighted cost value $a(u)$.

14. A method in accordance with claim 1, wherein the benefit value of a kernel is dependent upon profile data for the application.

15. A computer readable medium containing program instructions that, when executed on a computer, perform the method of claim 1.

16. A method for automatic selection of a subset of a set of streaming kernels of an application, the method comprising:
  identifying the set of streaming kernels from a high level description of the application;
  for each streaming kernel of the set of streaming kernels:
    estimating a relative benefit of implementing the streaming kernel in hardware, the relative benefit of the streaming kernel being dependent upon the computational complexity of a corresponding streaming kernel, the input bandwidth of the corresponding streaming kernel and the output bandwidth of the corresponding streaming kernel; and
    estimating a relative cost of implementing the streaming kernel in hardware, the relative cost of the streaming kernel being dependent upon the resources required to implement the streaming kernel;
  for each iteration of a plurality of iterations:
    selecting, from the set of streaming kernels, a streaming kernel having the highest benefit to cost ratio;
    removing the selected streaming kernel from the set of streaming kernels;
    adding the selected streaming kernel to an ordered set of selected streaming kernels if the resulting total cost of implementing the ordered set of selected streaming kernels is less than a prescribed value; and
  outputting the ordered set of selected streaming kernels.

17. A method in accordance with claim 16, wherein the relative benefit of a streaming kernel is dependent upon profile data for the application.

18. A method in accordance with claim 16, wherein the relative benefit of a streaming kernel is further dependent upon the complexity of a memory access pattern of the streaming kernel.

19. A method in accordance with claim 18, wherein the benefit to cost ratio of streaming kernel u is calculated as a weighted sum of a node weight $n(u)$ of a corresponding streaming kernel, a measure $bw_{in}(u)$ of the input stream traffic to the node, a measure $bw_{out}(u)$ of the output stream traffic from the node and a measure $p(u)$ of the complexity of the memory access pattern for stream traffic, divided by a weighted cost value $a(u)$.

20. A computer readable medium containing program instructions that, when executed on a computer, perform the method of claim 16.

21. A method for automatic configuration of a streaming processor to execute at least a part of an application, the method comprising:
  forming a stream flow graph of the application by parsing a program of instructions of the application, the stream flow graph comprising a plurality of kernel nodes and a plurality of edges;
  determining a benefit value and a cost value for each kernel node of the plurality of kernel nodes in the stream flow graph, the benefit value of a kernel node being dependent upon the computational complexity, the input bandwidth and the output bandwidth of a streaming kernel of the application corresponding to the kernel node;
  selecting a subset of kernel nodes of the plurality of kernel nodes to maximize a weighted sum of the benefits values of the subset of kernel nodes subject to a constraint that the sum of cost values is not greater than a prescribed value for the reconfigurable processor; and
  implementing the streaming kernels corresponding to the subset of kernel nodes on the processor.

22. A method in accordance with claim 21, wherein the weighted benefit value of kernel node u is calculated as a weighted sum of a node weight $n(u)$ of a corresponding streaming kernel, a measure $bw_{in}(u)$ of the input stream traffic to the node, a measure $bw_{out}(u)$ of the output stream traffic from the node and a measure $p(u)$ of the complexity of the memory access pattern for stream traffic, divided by a weighted cost value $a(u)$.

23. A reconfigurable processor configured in accordance with claim 21.

* * * * *